(12) United States Patent
Bahman et al.

(10) Patent No.: US 12,722,160 B1
(45) Date of Patent: Sep. 1, 2026

(54) MAGNETIC NANOLUBRICANT FILTRATION SYSTEM FOR HIGH-EFFICIENCY COMPRESSORS

(71) Applicant: KUWAIT UNIVERSITY, Safat (KW)

(72) Inventors: Ammar M. Bahman, Safat (KW); Emil Pradeep T., Safat (KW)

(73) Assignee: KUWAIT UNIVERSITY, Safat (KW)

( * ) Notice: Subject to any disclaimer, the term of this patent is extended or adjusted under 35 U.S.C. 154(b) by 0 days.

(21) Appl. No.: 19/648,981

(22) Filed: Apr. 15, 2026

(51) Int. Cl.

| | |
|---|---|
| ***B03C 1/30*** | (2006.01) |
| ***B03C 1/033*** | (2006.01) |
| ***F16N 39/06*** | (2006.01) |

(52) U.S. Cl.
CPC .............. *B03C 1/30* (2013.01); *B03C 1/0332* (2013.01); *F16N 39/06* (2013.01)

(58) Field of Classification Search
None
See application file for complete search history.

(56) References Cited

U.S. PATENT DOCUMENTS

| | | | | |
|---|---|---|---|---|
| 11,253,870 | B2 * | 2/2022 | Richter | B03C 1/286 |
| 2005/0077646 | A1 * | 4/2005 | Akiba | D06M 11/05 264/211.14 |
| 2018/0087419 | A1 | 3/2018 | Poster | |

OTHER PUBLICATIONS

Alfa Laval, "Automatic filters for fuel and lubricating oil", Website, www.alfalaval.com, First available online Oct. 20, 2016.
Machinery Lubrication, "Magnetic Filtration Applications and Benefits", Website, www.machinerylubrication.com, First available online Sep. 2005.
Prijic et al., "Magnetic nanoparticles as targeted delivery systems in oncology", Radiol Oncol. 2011; 45(1), pp. 1-16, First available online Jan. 19, 2011.
WZ Magnetics, "Rectangular Neodymium Magnets: Key Features, Applications, and Benefits", Website, www.wzmagnetics.com, First available online Dec. 27, 2024.
E-Magnets, "What Are N52 Magnets & How Strong Are They?", Website, www.e-magnetsuk.com, First available online Nov. 16, 2023.
Nick Erickson, "Polyphenylene Sulfide (PPS): Resin for Extreme Conditions", Website, www.aprios.com, First available online Jul. 14, 2025.
Huzhou Raylane New Materials Co., Ltd., "Water Electret Microfiber Fabric for Oil Filter", Website, www.raylane2023.en.made-in-china.com, First available online Sep. 11, 2024.
FRAM, "FRAM Synthetic Endurance™", Website, www.fram.com, First available online Mar. 29, 2023.

(Continued)

*Primary Examiner* — Peter Keyworth
(74) *Attorney, Agent, or Firm* — Nath, Goldberg & Meyer; Joshua B. Goldberg

(57) ABSTRACT

A magnetic nano-lubricant filtration system includes a housing having a peripheral wall, a cavity defined by a space within the peripheral wall, a plurality of helical baffles on an inner surface of the peripheral wall, an inlet at a bottom end of the peripheral wall and an outlet at a top end of the peripheral wall; and a filter cartridge removably disposed within the cavity, the filter cartridge including a strainer, an electret nanofiber pre-filter above the strainer, a functionalized mesh filter above the electret nanofiber pre-filter, and an array of magnets above the functionalized mesh filter.

18 Claims, 2 Drawing Sheets

(56) References Cited

OTHER PUBLICATIONS

FRAM, "FRAM", Website, www.fram.com.
Chaiyachit et al., "Hall Effect Sensor for Measuring Metal Particles in Lubricant", Lecture Notes in Engineering and Computer Science, vol. 2196, First available online Mar. 1, 2012.

* cited by examiner

MAGNETIC NANOLUBRICANT FILTRATION SYSTEM FOR HIGH-EFFICIENCY COMPRESSORS

BACKGROUND

Field

The disclosure of the present patent application relates to a magnetic nanolubricant filtration system and, particularly, to a magnetic nanolubricant filtration system configured to capture magnetic nanoparticles suspended in thermal fluids.

Description of Related Art

Although nanofluids have been extensively studied for their superior thermal properties, their adoption in industrial HVAC systems has been restricted due to challenges such as particle agglomeration, instability, and the risk of nanoparticle deposition leading to clogging, fouling, and component degradation.

Conventional heat transfer fluids such as water, ethylene glycol, and lubricating oils exhibit limited thermal conductivity, constraining their performance in advanced thermal systems. Recent advances have introduced nanolubricants, lubricating oils infused with nanoparticles, as a promising solution to enhance heat transfer efficiency. In vapor compression systems, the transport of lubricant by refrigerant vapor within the compressor has driven interest in nanolubricants over nanorefrigerants, as nanoparticles preferentially accumulate in the lubricant phase, offering superior tribological and thermal performance. These nanolubricants significantly enhance tribological properties by reducing friction and wear, while also improving viscosity, stability, and load-carrying capacity within compressor components.

The use of nanoparticles such as Fe, Cu, Co, and other metallic additives in lubricating oils has demonstrated effective friction reduction and anti-wear behavior. This is primarily attributed to the formation of protective anti-wear films on friction surfaces, which help minimize direct metal-to-metal contact. Mechanistically, oils containing nano-additives reduce friction and wear through a combination of the colloidal effect, rolling effect, small-size effect, protective film effect, and third body effect. In addition to lowering the friction coefficient, solid additives in liquid lubricants also enhance the load-carrying capacity of the fluid, thus improving system reliability under high-stress conditions. However, this tribological efficiency is highly dependent on nanoparticle characteristics like nanoparticle type, concentration, morphology, dispersion stability, and interaction with the base fluid.

Among various nanoparticles the magnetic nanoparticles dispersed in lubricating oil have attracted the attention of most researchers due to several advantages over other nanoparticles. Magnetic nanoparticles are considered highly effective for reducing friction and wear due to their tunable flow behavior under external magnetic fields and low chemical reactivity with existing oil additives. Ferrofluid, or magnetic fluid, is a stable colloidal suspension of single-domain magnetic nanoparticles (~10 nm) dispersed in a carrier liquid. The stability of magnetic fluid depends on particle-particle and particle-carrier interaction. Therefore, functionalization of magnetic nanoparticles is essential. This is achieved either by steric stabilization or electrostatic stabilization. To prevent agglomeration from Van der Waals forces, these particles are coated with surfactants that form tightly bonded monomolecular layers on their surfaces. Brownian motion prevents sedimentation, and in the presence of an external magnetic field, the particles align along the field, resulting in macroscopic magnetization. Their nano-scale size allows them to penetrate frictional contact zones, enhancing lubrication. When uniformly dispersed in base oils, they form stable magnetic lubricants with diverse applications, including tribological systems such as seals, bearings, and gears, biomedical fields like hyperthermia and targeted drug delivery, and various engineering systems including transformer cooling, lubrication, and automotive technologies.

Thus, a magnetic nanolubricant filtration system solving the aforementioned problems is desired.

SUMMARY

According to one embodiment, the present subject matter relates to a magnetic nano-lubricant filtration system including a housing having a peripheral wall, a cavity defined by a space within the peripheral wall, a plurality of helical baffles on an inner surface of the peripheral wall, an inlet at a bottom end of the peripheral wall and an outlet at a top end of the peripheral wall; and a filter cartridge removably disposed within the cavity, the filter cartridge including a strainer, an electret nanofiber pre-filter above the strainer, a functionalized mesh filter above the electret nanofiber pre-filter, and an array of magnets above the functionalized mesh filter.

According to an embodiment, a magnetic nanolubricant filtration system includes a housing having a peripheral wall, a cavity defined by a space within the peripheral wall, a plurality of helical baffles on an inner surface of the peripheral wall, an inlet at a bottom end of the peripheral wall and an outlet at a top end of the peripheral wall; and a filter cartridge removably disposed within the cavity, the filter cartridge including a strainer, an electret nanofiber pre-filter above the strainer, a functionalized mesh filter above the electret nanofiber pre-filter, and an array of magnets above the functionalized mesh filter, wherein the electret nanofiber pre-filter includes a polyvinylidene fluoride (PVDF) layer having a thickness of about 50 um, and the array of magnets includes a plurality of neodymium (NDFeB) magnets.

The present filtration system can effectively remove both conventional contaminants and nano-scale magnetic debris, addressing the needs of emerging nanolubricant-based systems.

These and other features of the present subject matter will become readily apparent upon further review of the following specification.

DETAILED DESCRIPTION

Figure 1:
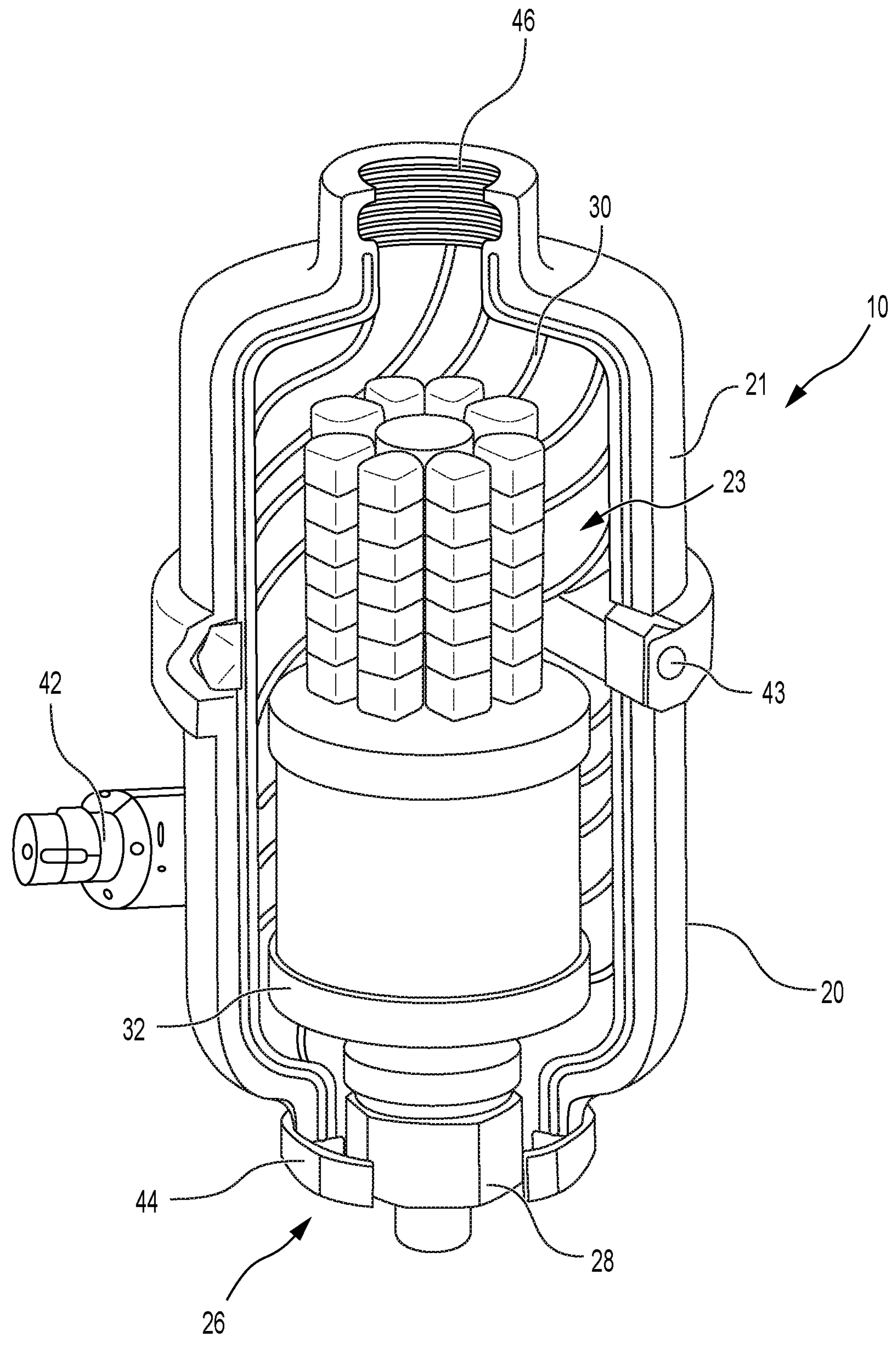
FIG. 1 is a perspective view of the magnetic nanolubricant filtration system according to the present teachings, with a section of the peripheral wall removed to show the cavity of the housing.

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

Figure 2:
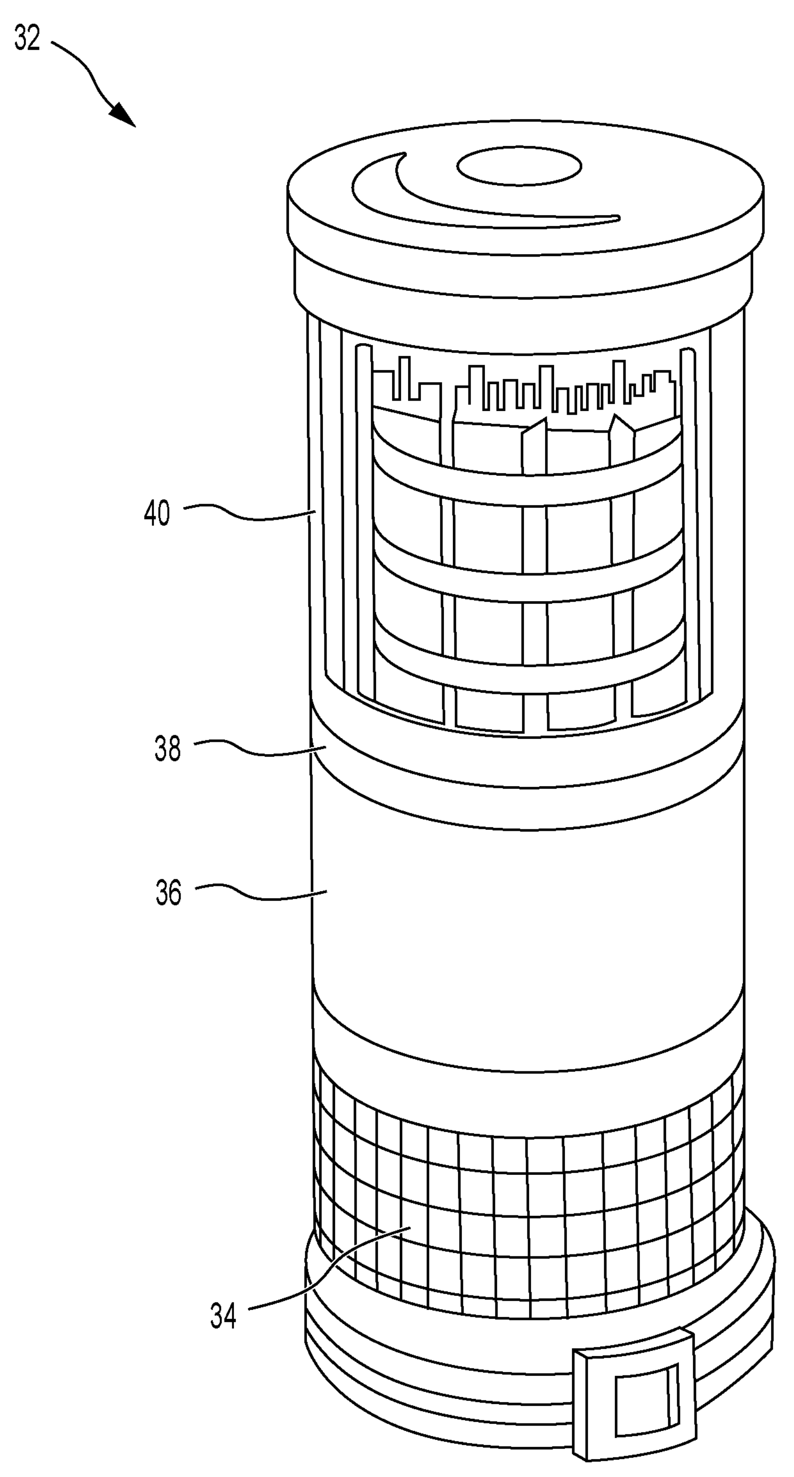
FIG. 2 is a sectional of the magnetic nanolubricant filtration system of FIG. 1, showing the removable cartridge and components thereof.

According to an embodiment, the present subject matter relates to a magnetic nanolubricant filtration system configured for use in compressors to capture magnetic nanoparticles suspended in thermal fluids. In an embodiment, the magnetic filtration system is configured for use in compressors in HVAC systems. As shown in FIG. 1, an embodiment of the filtration system, designated 10 in the drawings, includes a generally cylindrical housing 20 defined by a peripheral cylindrical wall 21 and an interior cavity 23 within the peripheral wall. The inlet 26 and outlet 46 are configured to be fluidly connected to the oil return line of the compressor lubrication system using standard threaded pipe connections commonly employed in HVAC and refrigeration circuits. This configuration allows nanoparticle-containing lubricant exiting the compressor to enter the filtration system, where magnetic nanoparticles perform their tribological function inside the compressor before being captured, and then return as cleaned lubricant to the compressor lubrication circuit. The housing 20 has an inlet 26 at a lower end thereof through which a lubricant for filtration may enter the interior cavity 23 and an outlet 46 at an upper end thereof through which a filtered lubricant may exit the interior cavity 23. The housing 20 includes helical baffles 30 defined along an inner surface of the cylindrical wall 21 to create a helical flow path for thermal liquids entering the filtration system 10. The cylindrical wall 21 can be made from a suitable corrosion resistant material, such as polyphenylene sulfide/Teflon (PPS/PTFE). A removable filter cartridge 32 is removably disposed within the cavity 23. As shown more clearly in FIG. 2, the removable cartridge 32 includes a strainer 34, an electret nanofiber pre-filter 36 above the strainer 34, a functionalized mesh filter 38 above the electret nanofiber pre-filter 36, and an array of magnets 40 above the functionalized mesh filter.

The electret nanofiber pre-filter 36 can include a polyvinylidene fluoride (PVDF) layer having a thickness of about 50 μm. The electret nanofiber pre-filter 36 can agglomerate and remove larger particles in the lubricant.

In an embodiment, the array of magnets 40 includes a plurality of magnets that are stacked in staggered or concentric rings. In an embodiment, the array of magnets 40 includes a plurality of neodymium (NDFeB) magnets. In an embodiment, the plurality of neodymium (NDFeB) magnets are Halbach array magnets made of N52 neodymium (NDFeB) and have a magnetic field strength above about 0.5 T (tesla) at about 5 mm gap.

The functionalized mesh filter 38 can include a porous stainless steel mesh coated with $Fe_3O_4$ nanoparticles. In an embodiment, the porous stainless steel mesh can include pores having a size ranging from about 90 μm to about 110 μm, e.g., about 100 μm. The selected pore size provides structural support and maintains low flow resistance within the filtration system, while allowing lubricant and suspended nanoparticles to pass through the mesh. The mesh filter 38 selectively captures and immobilizes magnetic nanoparticles smaller than about 10 nm. In an embodiment, capture of such nanoparticles is achieved primarily through magnetic attraction generated by the magnet array and through interaction with the $Fe_3O_4$-functionalized surface of the mesh, rather than by direct mechanical size exclusion. The stainless steel mesh can include 316L stainless steel. The mesh filter 38 can be a modular cartridge with a bayonet lock to facilitate replacement.

The housing can further include a bypass valve 28, such as a spring-loaded poppet valve with about 15 bar thresholds. The bypass valve 28 is incorporated near the inlet 26 to protect the system 10 under abnormal pressure rise, transient operating conditions, or cold-start events. System health and filtration performance can be monitored using a pressure transducer 42, which monitors clogging and measures a pressure drop across the filtration system. A Hall effect sensor 43, positioned adjacent to the array of magnets 40, monitors magnetic field integrity and nanoparticle accumulation. The filter cartridge 32 is secured within the housing using a bayonet lock mechanism 44, enabling rapid installation and removal while ensuring precise axial and rotational alignment of the magnetic core with the housing-integrated helical baffles 30. The outlet 46 is configured to allow cleaned lubricant to flow therethrough.

The inlet 26 is configured for receiving a lubricant for filtration, such as polyester (POE) oil or other lubricant. The lubricant flows through the inlet 26 towards the helical baffles 30. Thus, upon entering the filtration system 10, the lubricant is immediately guided into a helical flow path by the helical baffles 30. The helical baffles 30 impart a controlled tangential velocity component to the flow, ensuring a sustained swirling motion throughout an active filtration zone provided by the components of the removable cartridge. The helical motion serves two primary purposes: (i) to increase the residence time of the lubricant within the magnetic capture region provided by the plurality of magnets; and (ii) to drive magnetic nanoparticles radially outward toward regions of higher magnetic field intensity generated by the plurality of magnets.

Within the removable cartridge 32, the lubricant first passes through the strainer 34, which prevents larger debris from entering into sensitive compressor components located further along the flow path. Then, the lubricant passes through the electret nanofiber pre-filter 36, which captures non-magnetic nano- and micro-scale particulates while maintaining a low pressure drop. The lubricant then passes through the functionalized mesh filter 38, which acts as a secondary safeguard for residual particulates and assists in stabilizing the flow prior to magnetic separation. Following the functionalized mesh filter 38, the flow encounters the circumferentially arranged Halbach array of permanent magnets 40, which generates a strong, spatially directed magnetic field within the flow channel. The maintained helical flow ensures repeated exposure of suspended magnetic nanoparticles to the magnetic field, thereby promoting near-complete magnetic particle capture. The filtered lubricant then exits the system through the outlet 46 located at the upper section of the housing 10.

According to an embodiment, the magnetic nanolubricant filtration system enhances the performance and reliability of high-efficiency compressors in closed-loop thermal systems, particularly in HVAC and industrial applications. The present system addresses the critical challenge of managing magnetic nanoparticles suspended in nanolubricants, which are used to improve thermal conductivity and reduce friction. As magnetic nanoparticle-based nanolubricants can improve heat transfer performance, magnetic nanoparticle-based nanolubricants offer potential efficiency gains in systems like air conditioning, refrigeration, and other industrial thermal processes. In the past, however, integration of such nanolubricants into conventional closed-loop compressor systems introduces major challenges due to the potential escape of nanoparticles once their function is fulfilled. These nanoparticles pose contamination risks once their function is fulfilled, potentially leading to clogging, fouling, and system degradation. The present system resolves these challenges by capturing these nanoparticles to enhance the performance, efficiency, and operational lifespan of compressors utilized in closed-loop thermal energy systems.

Considering that a compressor accounts for up to 80% of the total power consumption in air conditioning systems, utilizing magnetic nanoparticles directly within the compressor offers substantial potential for reducing power consumption and improving overall system efficiency.

The proposed filtration system utilizes high-gradient magnetic arrays composed of neodymium magnets and a replaceable filter media within a flow-optimized housing. The bypass safety valve in the housing ensures pressure regulation during clogging events. The filter selectively captures and immobilizes magnetic nanoparticles smaller than 10 nm, achieving near-total filtration efficiency without compromising flow dynamics. Unlike conventional filters that target only large particulates, the system offers continuous, non-obstructive separation tailored for nanoparticle-laden lubricants.

Key advantages of the present system include extended compressor life, reduced maintenance, and improved system efficiency, especially under high thermal loads. The present filtration system can be useful for HVAC systems, automotive powertrains, renewable energy systems, aerospace components, and heavy industrial machinery. The system represents a significant advancement, enabling the practical, scalable deployment of magnetic nanofluids in thermal management technologies It is to be understood that the magnetic nanolubricant filtration system is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A magnetic nanolubricant filtration system, comprising:
- a housing having a peripheral wall,
- a cavity defined by a space within the peripheral wall,
- a plurality of helical baffles on an inner surface of the peripheral wall,
- an inlet at a bottom end of the peripheral wall and an outlet at a top end of the peripheral wall; and
- a filter cartridge removably disposed within the cavity, the filter cartridge comprising:
  - a strainer,
  - an electret nanofiber pre-filter above the strainer,
  - a functionalized mesh filter above the electret nanofiber pre-filter, and
  - an array of magnets above the functionalized mesh filter.

2. The system of claim 1, wherein the electret nanofiber pre-filter comprises a polyvinylidene fluoride (PVDF) layer.

3. The system of claim 2, wherein the polyvinylidene fluoride (PVDF) layer has a thickness of about 50 μm.

4. The system of claim 1, wherein the array of magnets comprises a plurality of neodymium (NDFeB) magnets.

5. The system of claim 1, wherein the array of magnets comprises a plurality of magnets arranged concentrically.

6. The system of claim 5, wherein the array of magnets comprises Halbach array magnets including N52 neodymium (NDFEB).

7. The system of claim 1, wherein the functionalized mesh filter comprises a porous stainless steel mesh coated with $Fe_3O_4$ nanoparticles.

8. The system of claim 1, wherein the functionalized mesh filter comprises pores having a size ranging from about 90 μm to about 110 μm.

9. The system of claim 1, wherein the housing comprises a bypass valve configured to protect the system under abnormal pressure rise.

10. The system of claim 1, wherein the housing comprises a pressure transducer configured to monitor clogging and measure a pressure drop across the filtration system.

11. The system of claim 1, wherein the housing comprises a Hall effect sensor configured to monitor a magnetic field integrity and nanoparticle accumulation in the system.

12. A magnetic nanolubricant filtration system, comprising:

a housing having a peripheral wall, a cavity defined by a space within the peripheral wall, a plurality of helical baffles on an inner surface of the peripheral wall, an inlet at top end of the peripheral wall and an outlet at a bottom end of the peripheral wall; and a filter cartridge removably disposed within the cavity, the filter cartridge comprising:

a strainer, an electret nanofiber pre-filter above the strainer, a functionalized mesh filter above the electret nanofiber pre-filter, and an array of magnets above the functionalized mesh filter, wherein the electret nanofiber pre-filter includes a polyvinylidene fluoride (PVDF) layer having a thickness of about 50 μm, and the array of magnets includes a plurality of neodymium (NDFeB) magnets.

13. The system of claim 12, wherein the plurality of neodymium (NDFeB) magnets comprises Halbach array magnets including N52 neodymium (NDFeB).

14. The system of claim 11, wherein the functionalized mesh filter comprises a porous stainless steel mesh coated with $Fe_3O_4$ nanoparticles.

15. The system of claim 11, wherein the functionalized mesh filter comprises pores having a size ranging from about 90 μm to about 110 μm.

16. The system of claim 11, wherein the housing comprises a bypass valve configured to protect the system under abnormal pressure rise.

17. The method of claim 11, wherein the housing comprises a pressure transducer configured to monitor clogging and measure a pressure drop across the filtration system.

18. The system of claim 11, wherein the housing comprises a Hall effect sensor configured to monitor a magnetic field integrity and nanoparticle accumulation in the system.

* * * * *